Aug. 15, 1961 R. J. ASPEEK 2,996,314
AUTOMATIC CLOSURE DEVICE FOR GLAD-HAND COUPLINGS
Filed Jan. 25, 1960
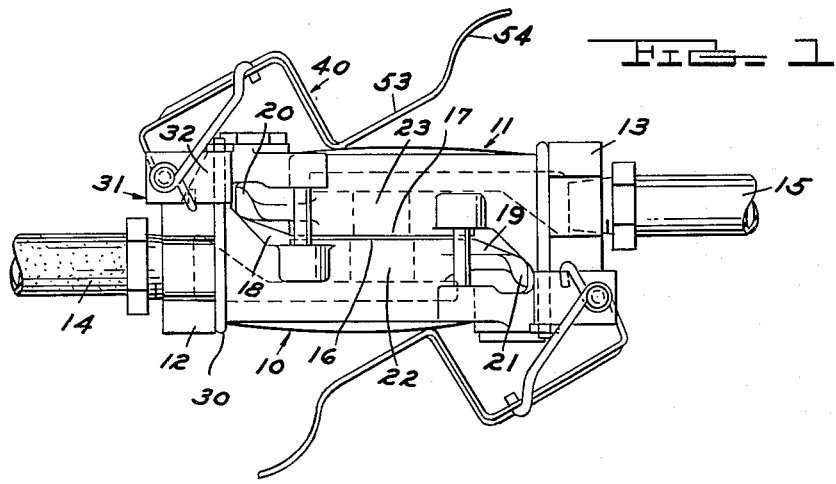
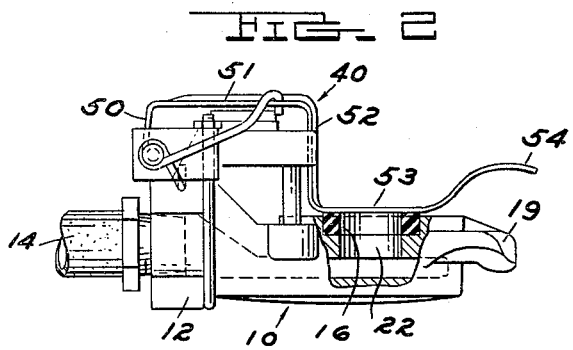
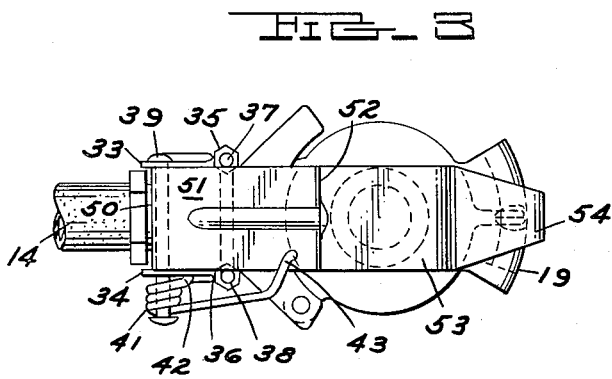
INVENTOR.
REGINALD J. ASPEEK
BY
ATTORNEY

United States Patent Office 2,996,314
Patented Aug. 15, 1961

2,996,314
AUTOMATIC CLOSURE DEVICE FOR GLAD-HAND COUPLINGS
Reginald James Aspeek, 8403 Millis Road, Utica, Mich.
Filed Jan. 25, 1960, Ser. No. 4,413
1 Claim. (Cl. 284—7)

This invention relates to an automatic sealing closure device for glad-hand couplings to protect the seal and cover the aperture therein when the couplings are disconnected.

Glad-hand couplings and closures therefore have been employed heretofore to facilitate having the opening in the coupling covered when disconnected to prevent dirt from entering and to eliminate damage to the coupling seals, however, the several devices of the prior art have not proven entirely satisfactory inasmuch as they are complicated in design and construction, expensive to manufacture, difficult to use, and unsatisfactory in performance.

With the foregoing in view, the primary object in the invention is to provide a protective closure device for glad-hand coupling apertures which is simple in design and construction, inexpensive to manufacture, easy to use, and satisfactory in operation without interfering with the normal operation of the glad-hand couplings.

An object of the invention is to provide the pivotally mounted closure member which is spring pressed for normally covering and engaging the aperture of the coupling and which is manually displaceable from the coupling aperture so that mating couplings can be connected.

An object of the invention is to provide a pivotally mounted spring pressed closure member for glad-hand couplings which spring presses against the mating coupling when the couplings are connected, so that when the couplings are disconnected, the closure member automatically moves under the power of the spring into a closure-protective relationship to the glad-hand seal and aperture.

An object of the invention is to provide a U-bolt and yoke for mounting the device on a portion of the glad-hand coupling for pivotally supporting the closure member without interference with the coupling's operation.

These and other objects of the invention will become apparent by reference to the following description of a closure device for preventing the entry of dirt and for protecting the seals by reference to the following description of a closure member for glad-hand couplings embodying the invention taken in connection with the accompanying drawing in which:

FIG. 1 is a side elevational view of mating glad-hand couplings in connected relationship showing the closure members pivoted back against their driving springs.

FIG. 2 is a side elevational view, partly in cross section, showing the bottom portion of the glad-hand coupling of FIG. 1 disconnected from its mating coupling with the closure member in covering and protecting relationship; and FIG. 3 is a top plan view of the device seen in FIG. 2.

Referring now to the drawing wherein like numerals refer to like and corresponding parts throughout the several views, the protective closure device and glad-hand coupling combination disclosed therein to illustrate the invention comprises mating glad-hand couplings 10 and 11 respectively having neck portions 12 and 13, hose connections 14 and 15, opposed faces and seals 16 and 17, cam receiving sockets 18 and 19, and mating interconnecting cams 20 and 21 and, as is well understood in the glad-hand coupling art, these couplings are interconnected together by disposing them face to face and giving them a quarter turn whereby their respective cams and sockets interlock to hold the couplings in interlocked and sealed relationship with the apertures of the seals 22 and 23 in communication; the glad-hand coupling devices 10 and 11 are disconnected by a reverse quarter twist.

The closure and protective device comprises a U-bolt 30 enveloping the neck 12 of the coupling 10 and a yoke 31 having a cross span member 32 overlying the neck 12 reversely bent into the flanges 33 and 34 forming sockets 35 and 36 which receive the U-bolt 30 arms; nuts 37 and 38 on the U-bolt 30 arms bear against the socket portions 35 and 36 of the yoke 31 fixedly connecting the yoke to the glad-hand coupling neck 12.

The flanges 33 and 34 have paired aligned apertures through which the pivot pin 39 is disposed and the closure cover member 40 is pivotally mounted on the pin 39 as is the spring 41 having an end 42 engaging the flange 34 and an end 43 engaging the cover member 40 urging the cover member 40 normally downwardly into engagement with the seal 16.

The closure cover member 40 preferably has an upwardly rising portion 50, a transverse portion 51 leading over the boss of the coupling, and a downwardly extending portion 52 to the cover plate portion 53 which extends and leads into the finger tab 54. The description of the sealing device has been described in conjunction with the coupling 10 but since the coupling 11 is the same it is obvious that the mounting of the device thereon is also the same making further description unnecessary.

To mount the device as seen in FIG. 2, the user merely places the U-bolt 30 around the neck 12 or 13 of the coupling, places the yoke 31 in position and secures the nuts 36 and 37 thereon and the device is completely mounted due to the fact that in the manufacture of the device, the yoke 31, spring 41, and cover member 40 are all integrated and this provides for a very fast and efficient connection of the device to the glad-hand couplings.

After the device has been mounted on the coupling as seen in FIG. 2 it will be observed that the device covers the aperture 22 of the seal 16 and protects it from dirt and damage of accidental striking and to connect the glad-hand couplings together as seen in FIG. 1, the user pivots back the cover member 40 manually by raising the finger tab 54 against the spring 41 and then matingly engages the couplings 10 and 11 together whereby the cover members 40 are spring pressed in abutting relationship against the backs of the mating couplings in a ready position and biased under the spring pressure to cover and protect the coupling apertures immediately upon their disconnection and it is obvious that when the connected couplings of FIG. 1 are disconnected to the condition seen in FIGS. 2 and 3, that the spring pressed cover member 40 will automatically move from the position seen in FIG. 1 to that of FIG. 2 to cover and protect the glad-hand coupling opening and seal.

The inventive protective and closure device with these features constitutes a compact, durable, and neat appearing mechanism easily operated to attach and connect and disconnect and provides an attractive appearance and does not unduly encumber the couplings in their normal operations.

Although but a single embodiment of the invention has been shown and described in detail it is obvious that many changes may be made in the size, shape, detail, and arrangement of the various elements in the invention within the scope of the appended claim.

I claim:

In combination with a glad-hand coupling, a sealing device for glad-hand couplings adapted to immediately automatically provide a closure for the coupling aperture when disconnected and adapted to be manually displaced for connecting glad-hand couplings together comprising; a U-bolt surrounding a portion of the coupling, a yoke surrounding a portion of the coupling in opposition to said U-bolt; said yoke having receiving sockets receiving said U-bolts; nuts on said U-bolt abutting said yoke urging said U-bolt and yoke together so as to grip the coupling disposed therebetween; said yoke having extending paired flanges having aligned apertures; a pivot pin disposed in said flange apertures; a glad-hand coupling hole cover member pivotally disposed on said pin, and a spring urging said cover member downwardly in a direction toward the aperture of the glad-hand coupling on which the sealing device is mounted; said cover member being manually pivotable against said spring to displace said cover for the area of the glad-hand coupling aperture to permit the mating coupling being connected to the coupling on which said sealing device is mounted; said cover member abutting the mating coupling back portion when the couplings are connected under spring tension so that when the mating coupling is disconnected, said cover member is automatically moved by said spring into hole sealing relationship of the coupling on which the device is mounted; said coupling having a high boss adjacent its mating side; said U-bolt and yoke being attached to said coupling behind said boss; said yoke providing an elevated pivot point for said pivot pin; said cover member having a first portion rising from said pin to a point above said coupling boss, a second portion overlying the coupling boss, a third portion leading down to said coupling's sealing mating face, a fourth portion covering said sealing face, and a fifth portion constituting a handle.

References Cited in the file of this patent

UNITED STATES PATENTS

| | | |
|---|---|---|
| 596,821 | McClellan | Jan. 4, 1898 |
| 603,190 | Hoey | Apr. 26, 1898 |
| 629,987 | Dutton | Aug. 1, 1899 |
| 1,670,954 | Coleman | May 22, 1928 |
| 2,537,095 | Schroeder | Jan. 9, 1951 |